3,394,166
TRIPHENYLPHOSPHINE(DITHIOCARBOXY)
CYANOMETHYLENE AND DERIVATIVES
James J. Pappas, Flushing, N.Y., and Edward Gancher, West New York, N.J., assignors to Interchemical Corporation, New York, N.Y., a corporation of New York
No Drawing. Filed Jan. 21, 1966, Ser. No. 524,650
4 Claims. (Cl. 260—455)

This invention relates to various sulfur-containing phosphinemethylenes. More particularly it relates to compounds represented by the structural formula $$\left[\diagup\!\!\!\diagdown\right]_3\!\!-P\!=\!C\diagup^{CN}_{\diagdown CS_1R}$$

where R represents —H, —CH$_3$, —CH$_2$—CH$_3$, —CH$_2$CH$_2$CH$_2$CH$_3$, —CH$_2$COOCH$_3$, —CH$_2$—⟨phenyl⟩ or

—CH$_2$—⟨phenyl⟩—NO$_2$

Also included in the invention is a 1:1 (molar) complex of $$\left[\diagup\!\!\!\diagdown\right]_3\!\!-P\!=\!C\diagup^{CN}_{\diagdown H}$$

and $$\left[\diagup\!\!\!\diagdown\right]_3\!\!-P\!=\!C\diagup^{CN}_{\diagdown CS_2H}$$

These compounds are made by reacting phosphine cyanomethylenes with carbon disulfide and by reacting the products so obtained with aryl or alkyl halides via the triethylamine salts of the above mentioned products.

The resulting compounds are useful as pesticides, intermediates in syntheses, additives for petroleum products, colorants, etc.

EXAMPLE 1

(A) Triphenylphosphine(dithiocarboxy)cyanomethylene

To 7.08 g. (0.0235 mole) of triphenylphosphinecyanomethylene in 100 ml. of chloroform were added 160 ml. of carbon disulfide. The solution was allowed to stand at room temperature for 24 hours and then evaporated to dryness under vacuum. The very bright yellow crystalline residue weighed 8.68 g., a 98% yield, and had a melting point of 159–162° C. (dec.). A sample recrystallized from chloroform-petroleum ether had a melting point of 162–4° C. (dec.).

(B) The triethylamine salt of triphenylphosphine (dithiocarboxy)cyanomethylene

To 4.52 g. (0.0150 mole) of triphenylphosphinecryanomethylene in 40 ml. of chloroform were added 2.8 ml. (0.020 mole) of triethylamine and 1.2 ml. (0.020 mole) of carbon disulfide. The solution was allowed to stand overnight and then evaporated to dryness under vacuum. The residue was slurried in benzene and filtered to give 5.38 g. (a 75% yield) of the canary yellow triethylamine salt, M.P. 140–150° C. (dec.). A recrystallized sample melt at 145–150° C. (dec.).

EXAMPLE 2

Reaction of the triethylamine salt of triphenylphosphine (dithiocarboxy)cyanomethylene with aryl and alkyl halides The triethylamine salt of triphenylphosphine(dithiocarboxy)cyanomethylene was dissolved in chloroform and a 20% molar excess of the aryl or alkyl halide was added. The solution was allowed to stand at room temperature overnight, then the solvent was removed. The residue was treated with hot benzene and the triethylamine hydrohalide filtered off. The filtrate was evaporated to give almost quantitative yields of the aryl or alkyl ester of triphenylphosphine(dithiocarboxy)cyanomethylene.

| Aryl or alkyl groups in the halide: | M.P. (° C.) |
|---|---|
| CH$_3$— | 240–1 |
| CH$_3$CH$_2$— | 206–7 |
| CH$_3$CH$_2$CH$_2$CH$_2$— | 209–211 |
| 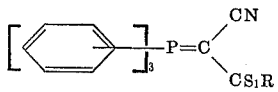 | 207–208 |
| 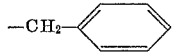 | 216–8 |
| CH$_3$O$_2$CCH$_2$— | 118–2 |

EXAMPLE 3

1:1 complex of triphenylphosphinecyanomethylene and triphenylphosphine(dithiocarboxy)cyanomethylene A mixture was made of 10.00 g. (0.0332 mole) of triphenylphosphinecyanomethylene in 25 ml. of chloroform and 1.10 ml. (0.0182 mole) of carbon disulfide. The mix gradually turned yellow and in about 45 minutes a bright yellow precipitate had formed. The batch was allowed to stand at room temperature for 16 hours. The solvent was removed under vacuum and the yellow solid slurried in 100 ml. of benzene. Filtration yielded 9.64 g. (85% yield) of the above-mentioned 1:1 complex. It melted at 160–166° C. with decomposition. A portion was purified by dissolving the product in chloroform reprecipitating with petroleum ether, filtering, and washing with benzene. The melting point was 165–168° C. (dec.). Analysis showed N, 4,36; P, 9.34; S, 9.24. Calculated for C$_{41}$N$_2$P$_2$S$_2$; N, 4.13; P, 9.13; S, 9.45.

The compounds of this invention are being tested as pesticides. Results now available show that at least three are effective against the fungus *Rhizoctoma solani* (cotton damping) as follows.

Percent (A) 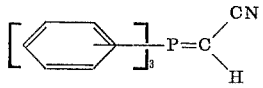 40

(B) Product of Example 3 _____ 60

(C) 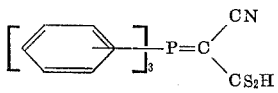 80

A also shows a 20% effect on Fusarium (Tomato Wilt)
B also shows a 20% effect on Fusarium; 10% on Pythium (Pea seed)
C shows an 18% effect on Bean rust and 20% on Fusarium.

Method of testing for effectiveness as a fungicide for cotton damping (*Rhizoctonia solani* organism) was the following. The organism was inoculated in sterilized soil from wheat-grown cultures each time the test was made. Preliminary tests were made with the chemicals by applying them at a dosage of 50 milligrams per pot, which measured 3½″ x 3½″ (equivalent to 64 lbs. per acre). Application was made in the form of 50 mgms. of the chemical in 5 ml. of acetone containing 45 ml. of a .01% by weight aqueous solution of "Triton–X–155" (alkylarylpolyether alcohol) poured over the surface of the soil as a drench. The pots are then incubated in a chamber at 70° F. for 2 days. This allows the mycelium to make surface growth. Activity rating of the chemical is based on the amount of this growth visible in 48 to 72 hours. Rating of effectiveness of the chemical is stated as percentages of control, e.g. 100% (maximum effectiveness), on down to 0, which would indicate no fungicidal effect at all.

Compounds analogous to those of Example 2 may be made by reacting the triethylamine salt of the Example 3 complex with alkyl or aryl halides.

What is claimed is:

1. A compound represented by the structural formula

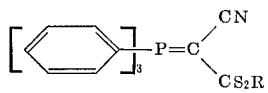

wherein R is a member selected from the group —H, —CH$_3$, —CH$_2$CH$_3$, —CH$_2$CH$_2$CH$_2$CH$_3$, —CH$_2$COOCH$_3$,

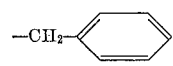

and

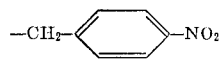

2. A compound which is a 1:1 molar complex of

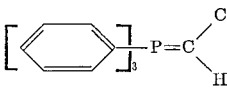 and 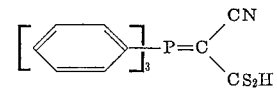

3. A compound represented by the structural formula

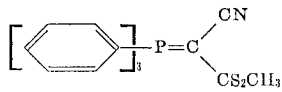

4. A compound represented by the structural formula

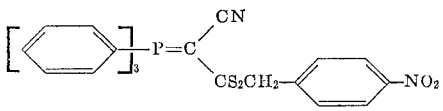

References Cited

UNITED STATES PATENTS 2,629,731   2/1953   Harmon _____ 260—455 XR

CHARLES B. PARKER, *Primary Examiner.*

D. R. PHILLIPS, *Assistant Examiner.*

UNITED STATES PATENT OFFICE
CERTIFICATE OF CORRECTION

Patent No. 3,394,166                          July 23, 1968

James J. Pappas et al.

It is certified that error appears in the above identified patent and that said Letters Patent are hereby corrected as shown below:

Column 1, line 15, in the equation, "$CS_1R$" should read -- $CS$ --; line 59, "triphenylphosphinecryanomethylene" should read -- triphenylphosphinecyanomethylene --; line 67, "melt" should read -- melted --. Column 2, line 20, "118-2" should read -- 171-2° --

Signed and sealed this 10th day of March 1970.

(SEAL)
Attest:

Edward M. Fletcher, Jr.                      WILLIAM E. SCHUYLER, JR.
Attesting Officer                               Commissioner of Patents